United States Patent
Sugahara et al.

(10) Patent No.: US 8,576,444 B2
(45) Date of Patent: Nov. 5, 2013

(54) PRINT DATA GENERATING DEVICE AND NON-TRANSITORY RECORDING MEDIUM FOR GENERATING PRINT DATA OF A PRINT IMAGE CONTINUING ON ONE OR MORE PAGES SO THAT ELECTRONIC IMAGE DATA OF THE PRINT IMAGE IS READILY AND RELIABLY OBTAINED FROM THE PRINT IMAGE

(75) Inventors: Hiroto Sugahara, Ama (JP); Masayuki Takata, Nagoya (JP); Tomoyuki Kubo, Nagoya (JP); Yoshinori Yokoe, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 95 days.

(21) Appl. No.: 13/032,902

(22) Filed: Feb. 23, 2011

(65) Prior Publication Data

US 2011/0211206 A1 Sep. 1, 2011

(30) Foreign Application Priority Data

Feb. 26, 2010 (JP) ................................. 2010-042859

(51) Int. Cl.
*G06F 3/12* (2006.01)
*G06K 15/00* (2006.01)
*G06K 9/34* (2006.01)
*G06K 9/18* (2006.01)
*G06K 9/54* (2006.01)
*H04N 1/60* (2006.01)
*H04N 1/40* (2006.01)

(52) U.S. Cl.
USPC ......... 358/1.9; 358/1.15; 358/1.18; 358/3.28; 382/164; 382/182; 382/306

(58) Field of Classification Search
USPC ........ 358/1.9, 1.4, 1.6, 1.17, 1.15, 1.12, 1.18, 358/1.8, 3.28, 296, 403, 448, 426.06, 453, 358/462, 478, 472, 505; 270/1.01, 52.02; 382/182, 183, 306, 130, 164, 173, 176; 235/462.01, 462.02, 462.03, 462.04, 235/462.07, 462.08, 462.09, 462.14
See application file for complete search history.

(56) References Cited

U.S. PATENT DOCUMENTS

| 6,137,590 | A | * | 10/2000 | Mori | 358/1.17 |
| 6,857,564 | B1 | * | 2/2005 | Takemoto et al. | 235/380 |
| 8,237,967 | B2 | | 8/2012 | Ito | |
| 2002/0030842 | A1 | | 3/2002 | Iida | |
| 2003/0048460 | A1 | * | 3/2003 | Vinals-Matas et al. | 358/1.8 |

(Continued)

FOREIGN PATENT DOCUMENTS

| JP | 06-217046 | 8/1994 |
| JP | 08-186703 | 7/1996 |

(Continued)

OTHER PUBLICATIONS

Notice of Reasons for Rejection received in corresponding Japanese Patent Application No. 2010-042859, mailed Mar. 5, 2013.

*Primary Examiner* — Ngon Nguyen

(74) *Attorney, Agent, or Firm* — Banner & Witcoff, Ltd.

(57) ABSTRACT

A print data generating device comprises a retrieving unit, a bar code data generating unit, and a print data generating unit. The retrieving unit is configured to retrieve image data of an original image. The bar code data generating unit is configured to generate, based on the image data of the original image, data of at least one bar code that stores the original image. The print data generating unit is configured to generate, based on the image data of the original image and the data of the at least one bar code, print data of a print image that includes the at least one bar code arranged on one page and the original image arranged on one or more pages.

17 Claims, 15 Drawing Sheets

FRONT SIDE
FOURTH SHEET

BACK SIDE
FOURTH SHEET

(56) References Cited

U.S. PATENT DOCUMENTS

| | | | |
|---|---|---|---|
| 2005/0219616 A1* | 10/2005 | Furuta et al. | 358/1.18 |
| 2009/0044106 A1* | 2/2009 | Berkner et al. | 715/273 |
| 2009/0161149 A1* | 6/2009 | Noguchi et al. | 358/1.15 |
| 2009/0190168 A1* | 7/2009 | Furuta et al. | 358/1.15 |
| 2009/0279110 A1 | 11/2009 | Ito | |
| 2010/0033754 A1* | 2/2010 | Okita | 358/1.15 |
| 2011/0036909 A1* | 2/2011 | Berkun et al. | 235/462.1 |
| 2011/0102853 A1* | 5/2011 | Makishima et al. | 358/3.28 |
| 2012/0287474 A1 | 11/2012 | Ito | |

FOREIGN PATENT DOCUMENTS

| | | |
|---|---|---|
| JP | 09-024646 | 1/1997 |
| JP | 09-150563 | 6/1997 |
| JP | 10-151821 | 6/1998 |
| JP | 2001-245116 | 9/2001 |
| JP | 2002-077474 | 3/2002 |
| JP | 2003-173421 | 6/2003 |
| JP | 2003-244424 | 8/2003 |
| JP | 2004-233409 A | 8/2004 |
| JP | 2005-345608 A | 12/2005 |
| JP | 2006-262078 A | 9/2006 |
| JP | 2008-185889 A | 8/2008 |
| JP | 2008-263469 | 10/2008 |
| JP | 2009-202438 A | 9/2009 |
| JP | 2009-251168 A | 10/2009 |
| JP | 2009-273025 A | 11/2009 |

* cited by examiner

Fig.4A
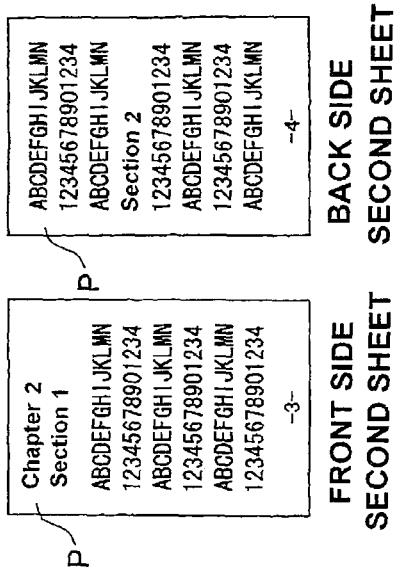
Fig.4B
Fig.4C
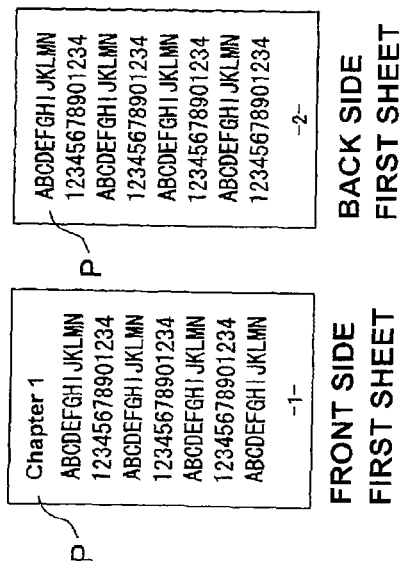
Fig.4D
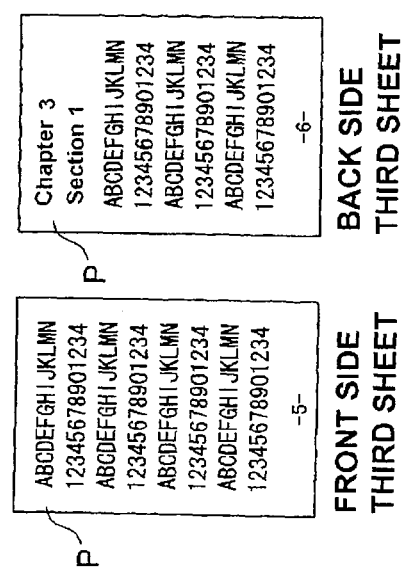
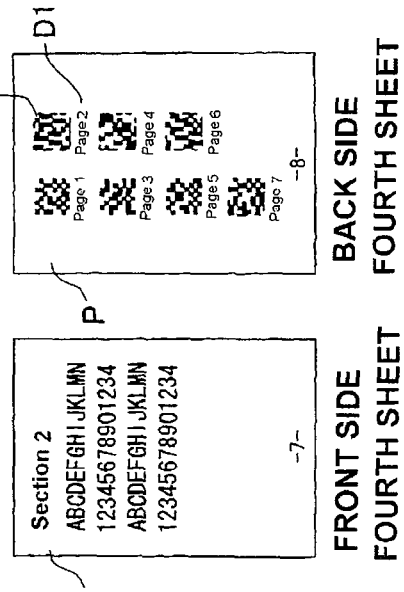

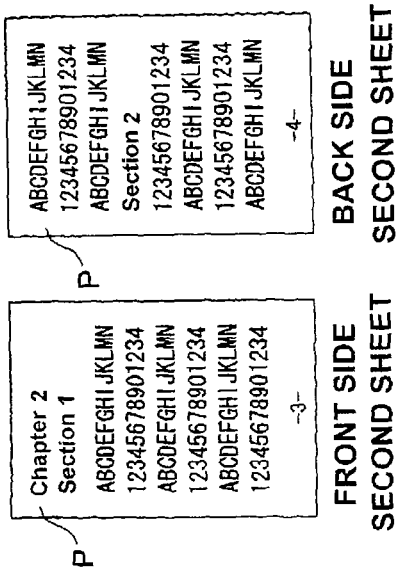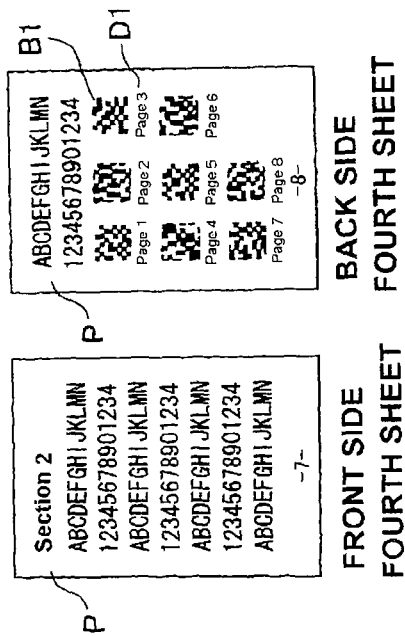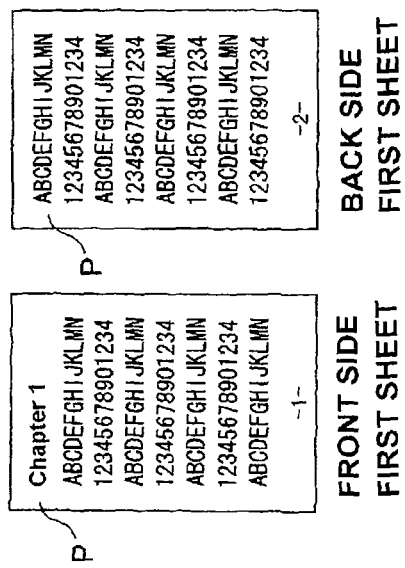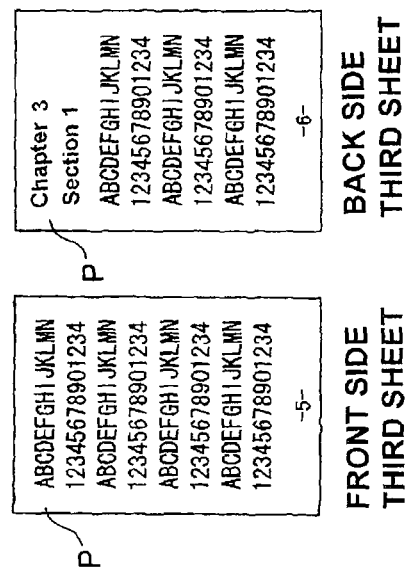

Fig.9A

Chapter 1
ABCDEFGHIJKLMN
12345678901234
ABCDEFGHIJKLMN
12345678901234
ABCDEFGHIJKLMN
12345678901234

–1–

FRONT SIDE
FIRST SHEET

ABCDEFGHIJKLMN
12345678901234
ABCDEFGHIJKLMN
12345678901234
ABCDEFGHIJKLMN
12345678901234
ABCDEFGHIJKLMN
12345678901234

–2–

BACK SIDE
FIRST SHEET

Fig.9B

Chapter 2
Section 1
ABCDEFGHIJKLMN
12345678901234
ABCDEFGHIJKLMN
12345678901234
ABCDEFGHIJKLMN
12345678901234

–3–

FRONT SIDE
SECOND SHEET

ABCDEFGHIJKLMN
12345678901234
ABCDEFGHIJKLMN
12345678901234
Section 2
12345678901234
ABCDEFGHIJKLMN
12345678901234

–4–

BACK SIDE
SECOND SHEET

Fig.9C

ABCDEFGHIJKLMN
12345678901234
ABCDEFGHIJKLMN
12345678901234
ABCDEFGHIJKLMN
12345678901234
ABCDEFGHIJKLMN
12345678901234

–5–

FRONT SIDE
THIRD SHEET

Chapter 3
Section 1
ABCDEFGHIJKLMN
12345678901234
ABCDEFGHIJKLMN
12345678901234
ABCDEFGHIJKLMN
12345678901234

–6–

BACK SIDE
THIRD SHEET

Fig.9D

Section 2
ABCDEFGHIJKLMN
12345678901234
ABCDEFGHIJKLMN
12345678901234

–7–

FRONT SIDE
FOURTH SHEET

Index
aaa  P1,3
bbb  P2
ccc  P4,5
ddd  P3,6
eee  P7

B1

–8–

BACK SIDE
FOURTH SHEET

PRINT DATA GENERATING DEVICE AND NON-TRANSITORY RECORDING MEDIUM FOR GENERATING PRINT DATA OF A PRINT IMAGE CONTINUING ON ONE OR MORE PAGES SO THAT ELECTRONIC IMAGE DATA OF THE PRINT IMAGE IS READILY AND RELIABLY OBTAINED FROM THE PRINT IMAGE

BACKGROUND OF THE INVENTION

1. Field of the Invention

The present application claims priority from Japanese Patent Application Publication No. JP-2010-042859, which was filed on Feb. 26, 2010, the disclosure of which is incorporated herein by reference in its entirety.

The present invention relates to a print data generating device and a non-transitory recording medium for generating print data of an image.

2. Description of Related Art

In a known character reader, a scanner reads an image, e.g., text, in a printed material and generates electronic image data, and character information is retrieved from the electronic image data by a character recognition process.

However, when the printed material is bounded sheets, e.g., a book, it is troublesome to turn pages one by one so that the scanner reads images printed on the pages. In addition, misrecognition of characters may occur when character information is retrieved from the electronic image data generated by the scanner.

SUMMARY OF THE INVENTION

A need has arisen for a print data generating device and a non-transitory recording medium for generating print data of a print image continuing on one or more pages so that electronic image data of the print image is readily and reliably obtained from the print image.

According to an embodiment of the invention, a print data generating device comprise a retrieving unit, a bar code data generating unit, and a print data generating unit. The retrieving unit is configured to retrieve image data of an original image. The bar code data generating unit is configured to generate, based on the image data of the original image, data of at least one bar code that stores the original image. The print data generating unit is configured to generate, based on the image data of the original image and the data of the at least one bar code, print data of a print image that includes the at least one bar code arranged on one page and the original image arranged on one or more pages.

According to another embodiment of the invention, a non-transitory recording medium stores a computer readable program that, if executed by a processor of a computer, causes the processor to execute the steps of generating, based on the image data of the original image, data of at least one bar code that stores the original image, and generating, based on the image data of the original image and the data of the at least one bar code, print data of a print image that includes the at least one bar code arranged on one page and the original image arranged on one or more pages.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

FIGS. 4A to 4D show an image and bar codes printed on recording media by the multi-function device, according to the first embodiment of the invention.

FIGS. 8A to 8D show an image and bar codes printed on recording media by a multi-function device, according to a fifth modification.

FIGS. 9A to 9D show an image and bar codes printed on recording media by a multi-function device, according to a sixth modification.

DETAILED DESCRIPTION OF EMBODIMENTS

Embodiments of the invention and their features and technical advantages may be understood by referring to FIGS. 1-13, like numerals being used for like corresponding parts in the various drawings.

Figure 1A:
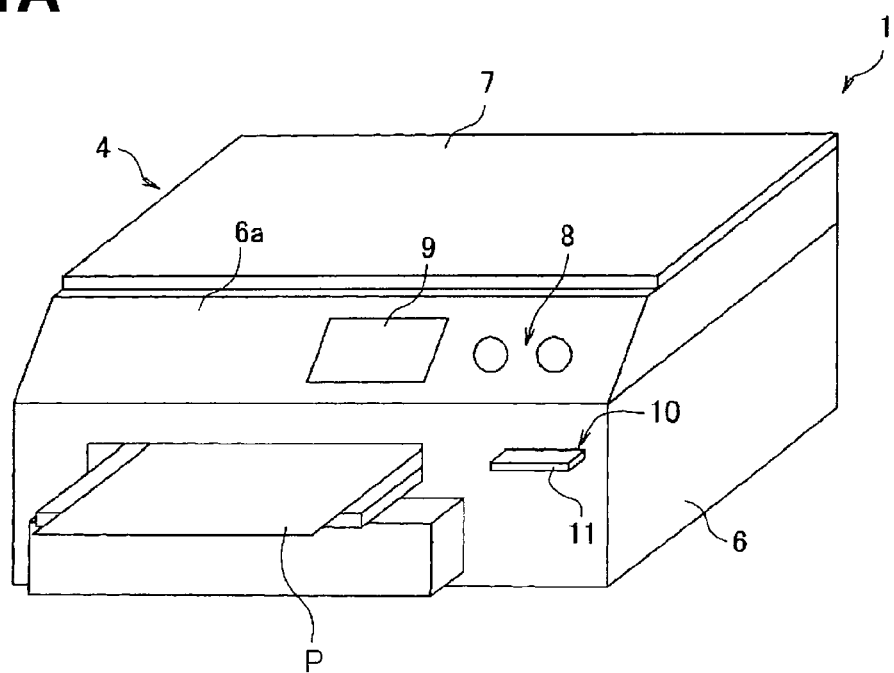
FIG. 1A shows a schematic view showing a multi-function device according to an embodiment of the invention.
Figure 1B:
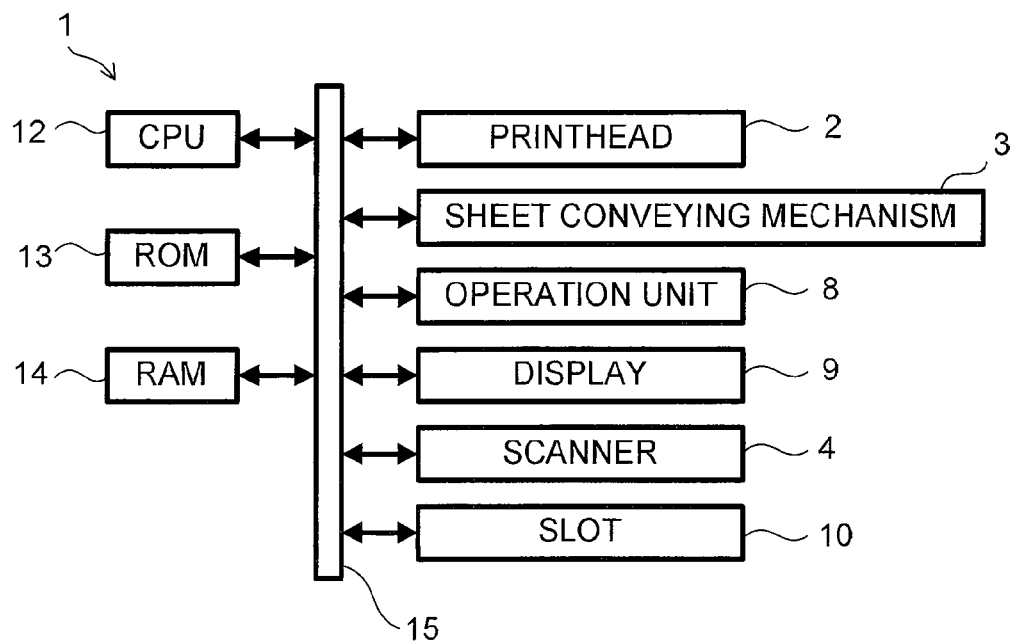
FIG. 1B is a block diagram showing an electrical structure of the multi-function device of FIG. 1A.
Figure 2:
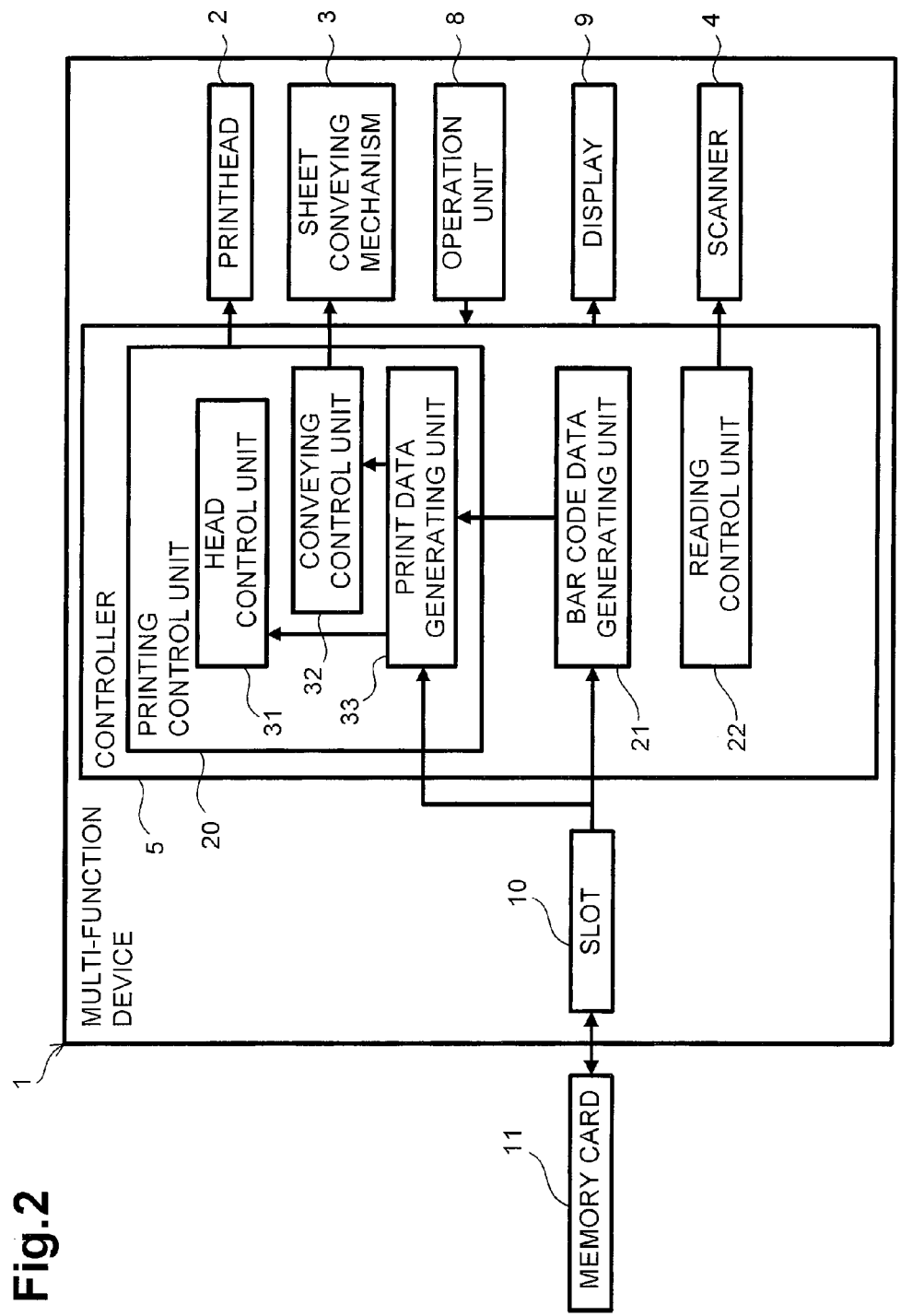
FIG. 2 is a diagram showing control executed by a controller of the multi-function device.
Figure 3:
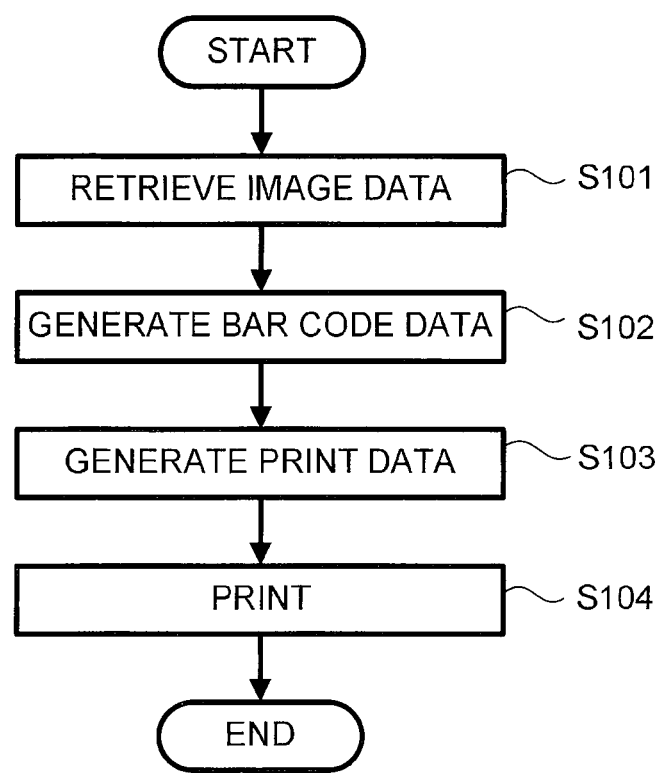
FIG. 3 is a flowchart showing a procedure executed by the multi-function device for printing an image and bar codes.
Figure 5A:
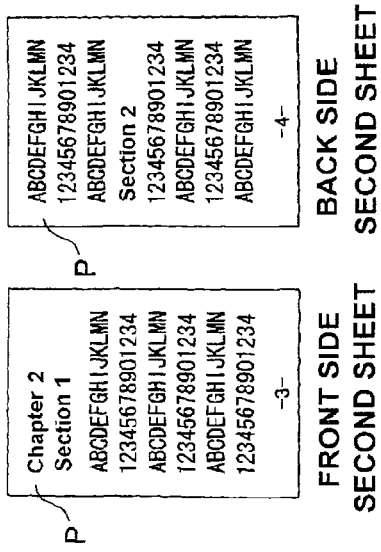
FIGS. 5A to 5D show an image and bar codes printed on recording media by a multi-function device, according to a first modification.
Figure 5B:
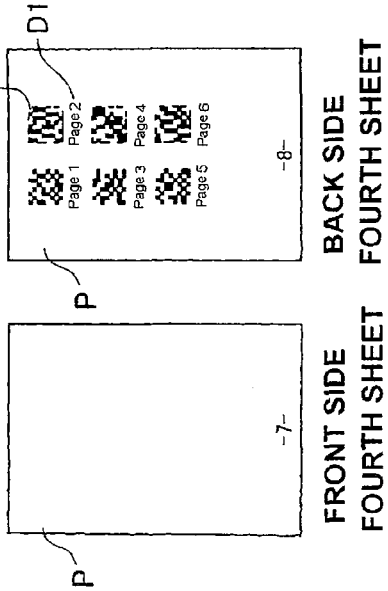
Figure 5C:
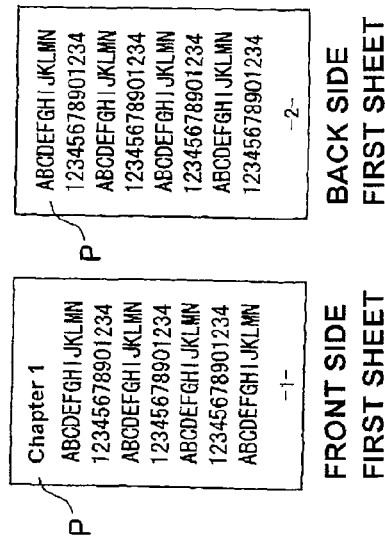
Figure 5D:
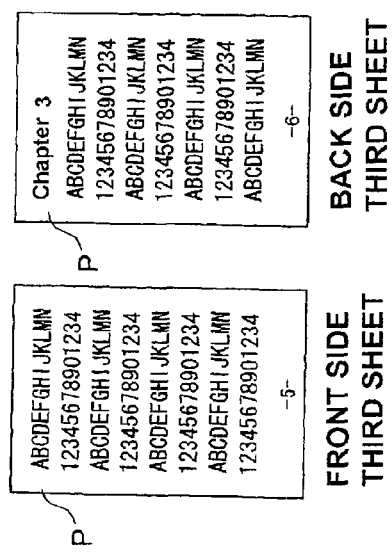
Figure 6A:
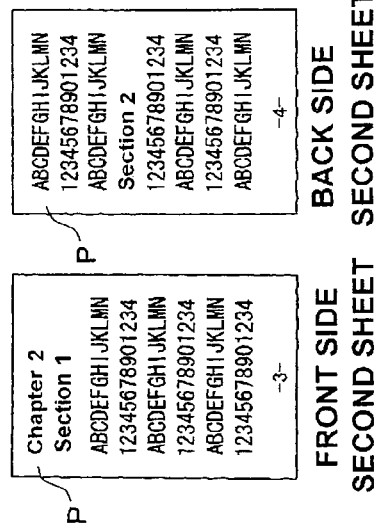
FIGS. 6A to 6D show an image and bar codes printed on recording media by a multi-function device, according to a third modification.
Figure 6B:
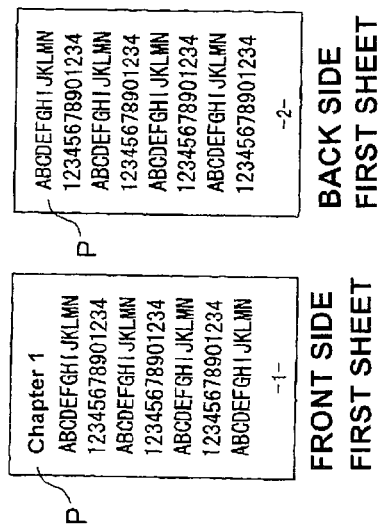
Figure 6C:
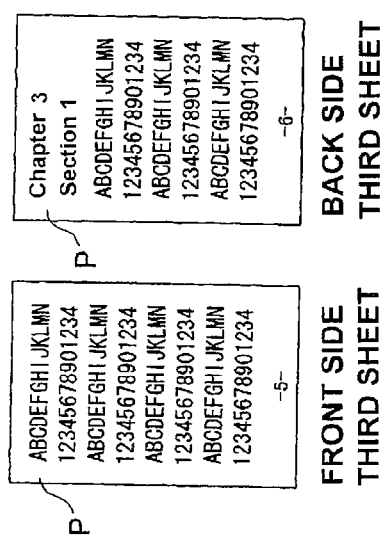
Figure 6D:
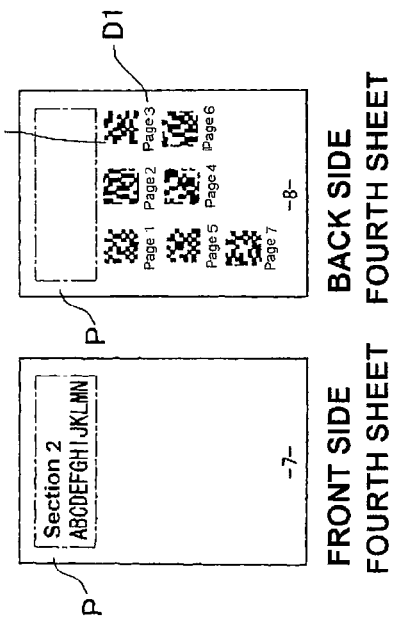
Figure 7A:
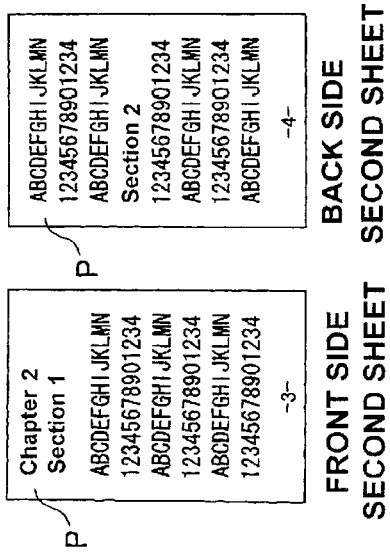
FIGS. 7A to 7D show an image and bar codes printed on recording media by a multi-function device, according to a fourth modification.
Figure 7B:
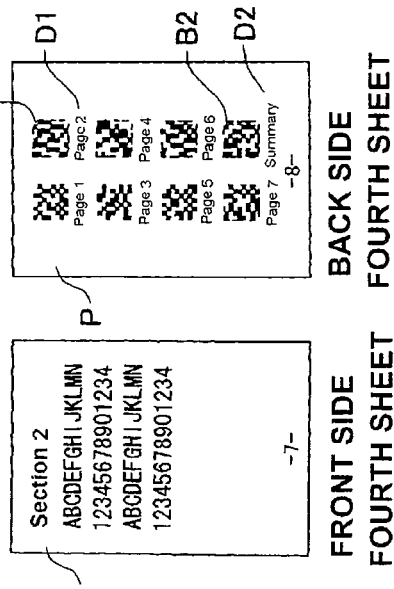
Figure 7C:
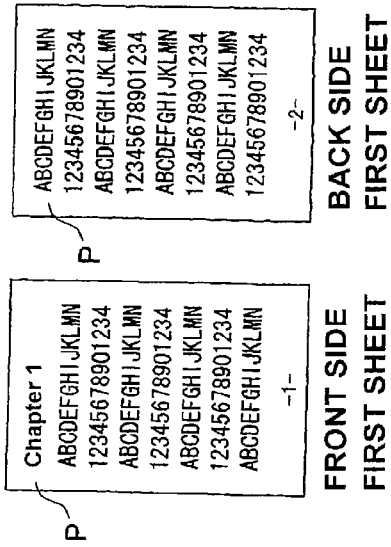
Figure 7D:
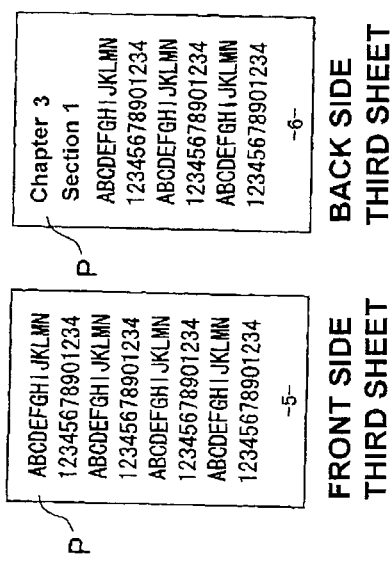

As shown in FIGS. 1 and 2, a multi-function device 1 according to an embodiment of the invention includes a printhead 2 that prints an image on a recording medium, such as a sheet P, a sheet conveying mechanism 3 that conveys the sheet P in a predetermined direction (forward in FIG. 1A), a scanner 4 that reads an image printed on the sheet P, and a controller 5 that controls the various mechanisms of the multi-function device 1, such as the printhead 2, the sheet conveying mechanism 3, and the scanner 4.

As shown in FIG. 1A, the multi-function device 1 has a substantially rectangular parallelepiped main body 6, in which the printhead 2, the sheet conveying mechanism 3, and so on are accommodated. The printhead 2 prints on the sheet P by a known method, such as an inkjet method, a laser method, or a thermal transfer method. The sheet conveying mechanism 3 is configured to convey the sheet P in a predetermined direction with a conveying roller that is rotationally driven by a motor.

The scanner 4 is provided at the top of the main body 6. As shown in FIG. 1A, the scanner 4 includes a glass original plate (not shown), a reading unit (not shown) disposed below the original plate, and a cover 7 that covers the upper surface of the original plate. The scanner 4 is configured to read an image printed on an original with the reading unit after the original is placed on the upper surface of the original plate, with the cover 7 closed.

An inclined surface 6a is formed at the upper part of the front of the main body 6. The inclined surface 6a is provided with an operation unit 8 having a plurality of operation buttons to be operated by a user and a display 9 that displays the operating state of the multi-function device 1, an error message, a content read from a bar code, to be described later, etc. The right of the front of the main body 6 is provided with a slot 10 in which a memory card 11 is to be inserted. Data, such as image data, recorded on the memory card 11 is retrieved and is input to the controller 5.

For ease of explanation, image data is input from the memory card 11 to the multi-function device 1 via the slot 10; the input of image data to the multi-function device 1 is not limited thereto. For example, image data may be input to the multi-function device 1 through a cable that connects the multi-function device 1 and a digital camera. Alternatively, image data may be input from a mobile phone having a camera function to the multi-function device 1 via a radio communication using infrared rays or the like.

As shown in FIG. 1B, the multi-function device 1 comprises a central processing unit (CPU) 12, a read only memory (ROM) 13, a random access memory (RAM) 14, the printhead 2, the sheet conveying mechanism 3, the operation unit 8, the display 9, and the slot 10. These elements are electrically connected with one another via a bus 15. The CPU 12 collectively controls the multi-function device 1 and operates in accordance with programs and data stored in the ROM 22. The RAM 14 temporarily stores data processed by the CPU 12. The CPU 12, ROM 13, and RAM 14 function as the controller 5.

As shown in FIG. 2, the controller 5 comprises a printing control unit 20, a bar-code-data generating unit 21, and a reading control unit 22. The bar-code-data generating unit 21 generates data of a bar code storing an image, based on image data input from the memory card 11 inserted in the slot 10.

The printing control unit 20 comprises a head control unit 31, a conveying control unit 32, and a print data generating unit 33. The head control unit 31 and the conveying control unit 32 control the printhead 2 and the sheet conveying mechanism 3, respectively, when the multi-function device 1 performs printing. The print data generating unit 33 generates print data of an image and a bar code to be printed by the multi-function device 1 from the image data input from the memory card 11 and the bar-code data generated by the bar-code-data generating unit 21.

When a print instruction is input from the operation unit 8 by the user, the image and the bar code are printed based on the print data generated by the print data generating unit 33, as will be described later. Here, the multi-function device 1 is configured to switch between one-side printing and double-side printing on a sheet P by an operation on the operation unit 8. The controller 5 displays the state (print state or standby state) of the multi-function device 1, an error message, etc. on the display 9 to notify the user of such information.

The reading control unit 22 controls the operation of a reading unit, e.g., the scanner 4, when it reads an image. The image read by the scanner 4 is stored, for example, in the memory card 11 inserted in the slot 10.

Next, printing of an image and bar codes performed by the multi-function device 1 will be described with reference to the flowchart in FIG. 3 and FIGS. 4A to 4D. In this embodiment, a print image is a seven-page document comprising three chapters (first to third chapters), and each of the second and third chapters comprises two sections (first and second sections). The document is printed on both sides of four sheets P. Here, FIGS. 4A to 4D illustrate images printed on the first to fourth sheets P, respectively. The images disposed on the left and right in each figure show the images printed on the front and back sides of each sheet P, respectively. Although this embodiment is described when applied to a case in which an image, e.g., a document is printed over seven pages, the number of pages is not limited thereto.

When an image and a bar code are to be printed by the multi-function device 1, first, image data, e.g., data of a document (original image) to be printed, is retrieved from the memory card 11 inserted in the slot 10 and is input to the controller 5 (step S101, hereinafter simply referred to as S101). Next, the bar-code-data generating unit 21 generates, based on the retrieved image data, bar-code data of seven bar codes B1 in which the contents of the individual pages of the document are stored (in which the document is stored segment by segment) (S102).

Next, the print data generating unit 33 generates, based on the image data read in S101 and the bar-code data generated in S102, print data of a print image that includes the seven bar codes arranged on one page and the document arranged on one or more pages (S103). The seven-page document is printed on both sides of the first to third sheets P and on the front side of the fourth sheet P, and the seven bar codes B1 are printed on the back side of the fourth sheet P (page 8) (S104), based on the generated print data. At this time, as shown in FIG. 4D, page numbers D1 indicating which bar code B1 corresponds to which page are also printed below or in the vicinity of the individual bar codes B1. The page numbers D1 function as identifying images for identifying the bar codes B1.

The four sheets P on which the document and the bar codes B1 are printed are stacked in order of page and are then bound with a stapler or the like. Thus, the page (page 8) on which the bar codes B1 are printed is the last page and serves as the back cover of the bound sheets P.

In this embodiment, the bar codes B1 storing the document are printed on one page collectively while the document is printed over the plurality of pages. Thus, the document is readily retrieved by reading the bar codes B1, for example, with the scanner 4, without the need for turning the pages one by one. This facilitates a third person other than the owner of the memory card 11, in which the document is stored, to convert the printed document into electronic form and to store the electronic data of the printed document, for example, in his/her memory card.

Furthermore, since data of the document containing character information can be retrieved from the bar codes B1 storing the document, the character information of the printed document can be accurately retrieved without the need to perform a character recognition process or a character information extraction process.

Furthermore, since the bar codes B1 are printed on a page serving as the back cover, the bar codes B1 can be read with the scanner 4 without the need for turning the pages of the bound sheets of the document at all. Accordingly, the bar codes B1 can be readily read.

Furthermore, the seven printed bar codes B1 store the individual pages of the document. Therefore, the contents of only desired pages of the document can be retrieved by reading the bar codes B1 corresponding to the desired pages.

Furthermore, since the page numbers D1 of corresponding pages are printed below the individual bar codes B, the user can readily ascertain which bar code B1 should be read.

Next, modifications in which various changes are made to this embodiment will be described. Descriptions of the same configurations as those of this embodiment are omitted as appropriate.

In a modification (first modification), as shown in FIGS. 5A to 5D, a six-page document is printed on three sheets P, and six bar codes B1 in which the contents of the individual pages are stored, respectively, are printed not on the front side of the fourth sheet P (page 7) but on the back side of the fourth sheet P (page 8). In this case, the print data generating unit 33 of the controller 5 is configured to generate the print data of a print image including the document arranged over a plurality of pages and the a plurality of bar codes arranged on the last page, and to add a blank page before the last page when the last page is an odd page.

Also in this case, since the page on which the bar codes B1 are printed serves as the back cover of the bound sheets, the bar codes B1 can be read without turning the pages at all.

In the first modification, although the bar codes B1 are printed on page 8 serving as the back cover, the bar codes B1 may be printed on the front side of the fourth sheet P (page 7) (second modification). Also in this case, the bar codes B1 storing the six pages of document are not printed on the back-cover side of the sheet P but are printed collectively on one page (page 7). Therefore, there is no need to turn the pages one by one when the scanner 4 reads the bar codes B1, and the bar codes B1 can be read only by opening the page on which the bar codes B1 are printed.

Furthermore, in the first and second modifications, the bar codes B1 are printed on the fourth sheet P separate from the first to third sheets P on which the document is printed. Therefore, no image is printed on the opposite side of the sheet P from the side on which the bar codes B1 are printed, and thus, no print image bleeds onto the side on which the bar codes B1 are printed. Accordingly, the bar codes B1 can be read with high accuracy. Here, if the printhead 2 is of an inkjet type in which ink is ejected from nozzles, ink ejected from the printhead 2 onto the sheet P penetrates through the sheet P, and thus, bleed-through is particularly prone to occur. Even in such a case, the bar codes B1 printed on the back of a blank page can be read with high accuracy.

A configuration for preventing the bleed-through is not limited to the configurations as in the first and second modifications, in which the bar codes B1 are printed on the sheet P separate from the sheets P on which the document is printed. In another modification (third modification), as shown in FIGS. 6A to 6D, a document continues to the upper end of the front side of the fourth sheet P (page 7), and the bar codes B1 are printed on the back side of the fourth sheet P (page 8), in a region below the region not overlapping with the document printed on page 7. FIGS. 6A to 6D illustrate the region of page 7 on which the document is printed and the region of page 8 that overlaps with the document printed on page 7 are indicated by chain lines.

Also in this case, even if the document printed on page 7 bleeds onto page 8 on which the bar codes B1 are printed, the bled-through document will not overlap with the bar codes B1, and thus, the bar codes B1 can be read with high accuracy.

Furthermore, in order to prevent the bar codes B1 and the bled-through document from overlapping with each other, the bar codes B1 may be printed in the margin of the sheet P that does not overlap with a region on which the document is printed.

In this embodiment, although only the bar codes B1 in which a document is stored are printed, the present invention is not limited thereto. In another modification (fourth modification), as shown in FIGS. 7A to 7D, in addition to the seven bar codes B1 in which the individual pages of the document are stored, another bar code B2 in which related information, e.g., a summary, of the document is stored may be printed. Furthermore, an identifying image, e.g., a character string "Summary" D2, may be printed below the bar code B2 to indicate the content of the bar code B2.

The summary stored in the bar code B2 may be stored in advance, for example, in the memory card 11. In this case, in S101 described above, data of the summary is retrieved together with data of the document (image data), and in S102 described above, the data of the bar codes B1 is generated based on the retrieved document data, and the data of the bar code B2 is generated based on the retrieved summary data.

Alternatively, summary data may be generated in S101 described above based on the retrieved document data, and the data of the bar code B2 may be generated in S102 based on the generated summary data.

In the fourth modification, the printed document itself can be retrieved by reading the bar codes B1, and the summary (related information) of the printed document can be retrieved by reading the bar code B2.

In the fourth modification, although the bar code B2 storing the summary of the document is printed, a bar code B2 storing another related information about the document, such as the author, creation date, version information, serial number, and translation, may be printed.

Furthermore, in the forgoing embodiment, although the bar codes B1 are printed on a page on which no document is printed, the present invention is not limited thereto. In another modification (fifth modification), as shown in FIGS. 8A to 8D, the document continues to the upper end of page 8, and the bar codes B1 may be printed collectively at a region below the document on page 8.

Also in this case, since the bar codes B1 in which the individual pages of the document are stored are printed collectively on one page, the document can be retrieved by reading the bar codes B1 without the need for turning the pages one by one.

In the forgoing embodiment, although the page numbers D1 of corresponding pages are printed below the bar codes B1, the positions at which the page numbers D1 are printed are not limited thereto so long as they are printed in the vicinity of the bar codes B1.

Furthermore, the page numbers D1 indicating which bar code B1 corresponds to which page may not be printed. Also in this case, the user can ascertain which bar code B1 corresponds to which page if the plurality of bar codes B1 are printed in order of page, for example.

Furthermore, in the forgoing embodiment, although the bar codes B1 are arranged in order of page, the present invention is not limited thereto. In another modification (sixth modification), as shown in FIGS. 9A to 9D, an index may be printed on the last page (page 8), and a page number on which an index word is described and the bar code B1 storing the corresponding page of the document may be printed at the right of each index word. The bar codes B1 are arranged not in order of page but in order of the index words. In this case, the user is allowed, while referring to the index words, to read with the scanner 4 only a bar code B1 corresponding to a necessary page of the document.

In the forgoing embodiment, although the individual pages of the document are stored in the individual bar codes B1, the invention is not limited thereto. In another modification (seventh modification), as shown in FIGS. 10A to 10D, the document is composed of three chapters, and the second and third chapters are each composed of two sections. The content of each section of the document is stored in one of a plurality of bar codes B3 (the first chapter is treated as a section). In the seventh modification, the first page of the document is a table of contents.

Figure 10A:
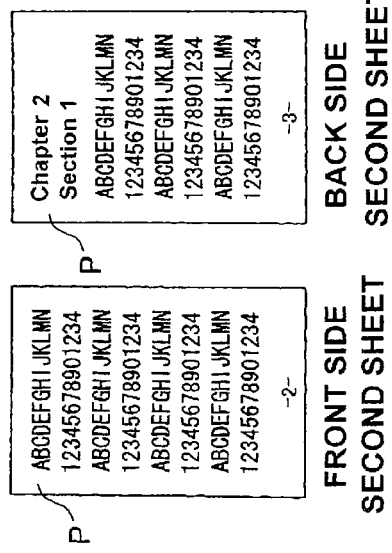
FIGS. 10A to 10D show an image and bar codes printed on recording media by a multi-function device, according to a seventh modification.
Figure 10B:
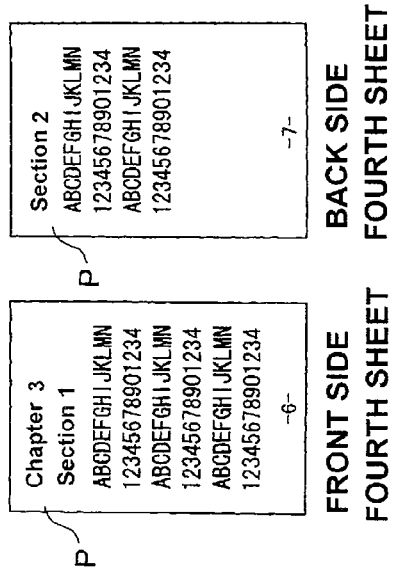
Figure 10C:
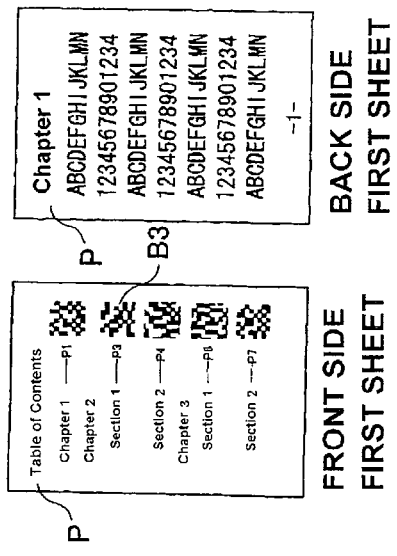
Figure 10D:
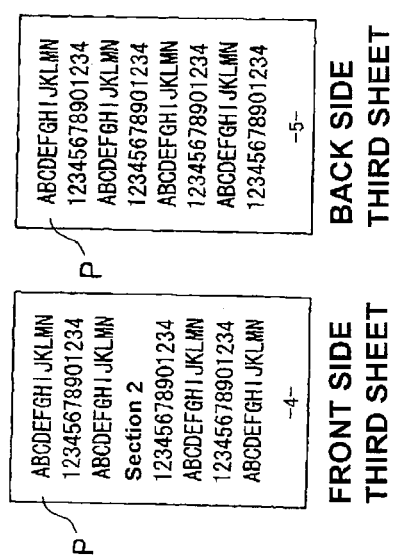

As shown in FIG. 10A, the table of contents is printed on the first page, and the corresponding bar codes B3 are printed on the table of contents, at the right of the heading of each section (at the right of the heading of the first chapter).

In this case, the user is allowed, while referring to the table of contents, to readily grasp the contents stored in the bar codes B3 and to read with the scanner 4 only a bar code B1 corresponding to a necessary section of the document.

Furthermore, in this case, since the table of contents and the bar codes B3 are printed on the first page serving as the front cover of the sheets P, the bar codes B3 can be read with the scanner 4, without the need for turning the pages at all.

Figure 11A:
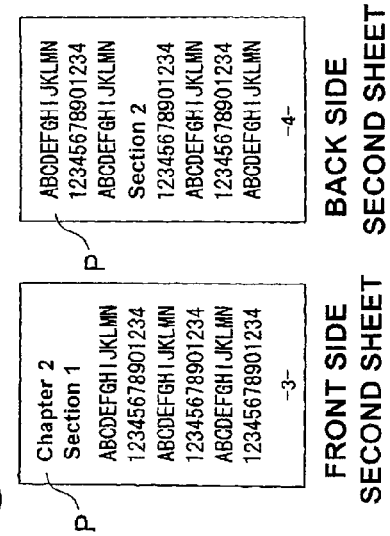
FIGS. 11A to 11D show an image and bar codes printed on recording media by a multi-function device, according to a eighth modification.
Figure 11B:
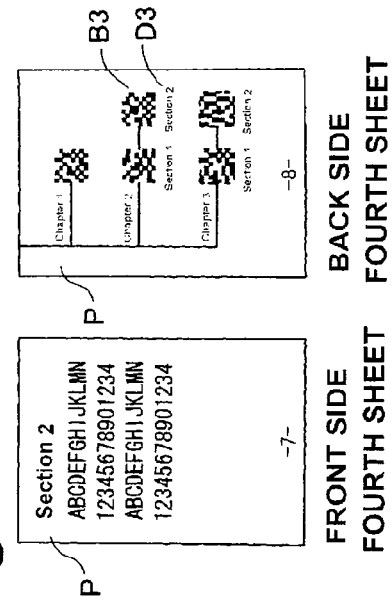
Figure 11C:
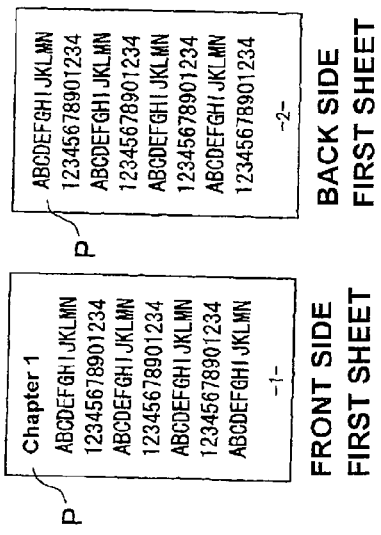
Figure 11D:
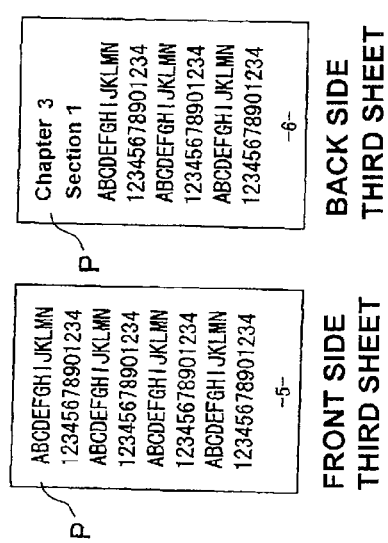
Figure 12A:
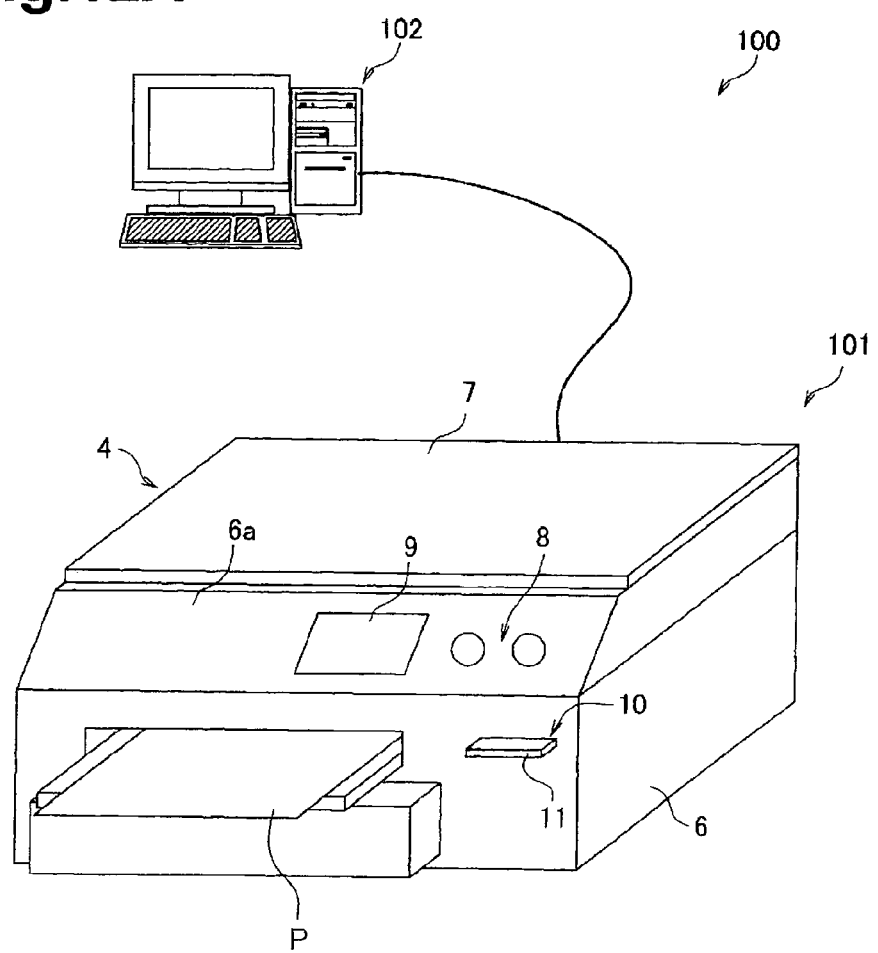
FIG. 12A shows a schematic view showing a printing system comprising a multi-function device and a personal computer (PC), according to a ninth modification.
Figure 12B:
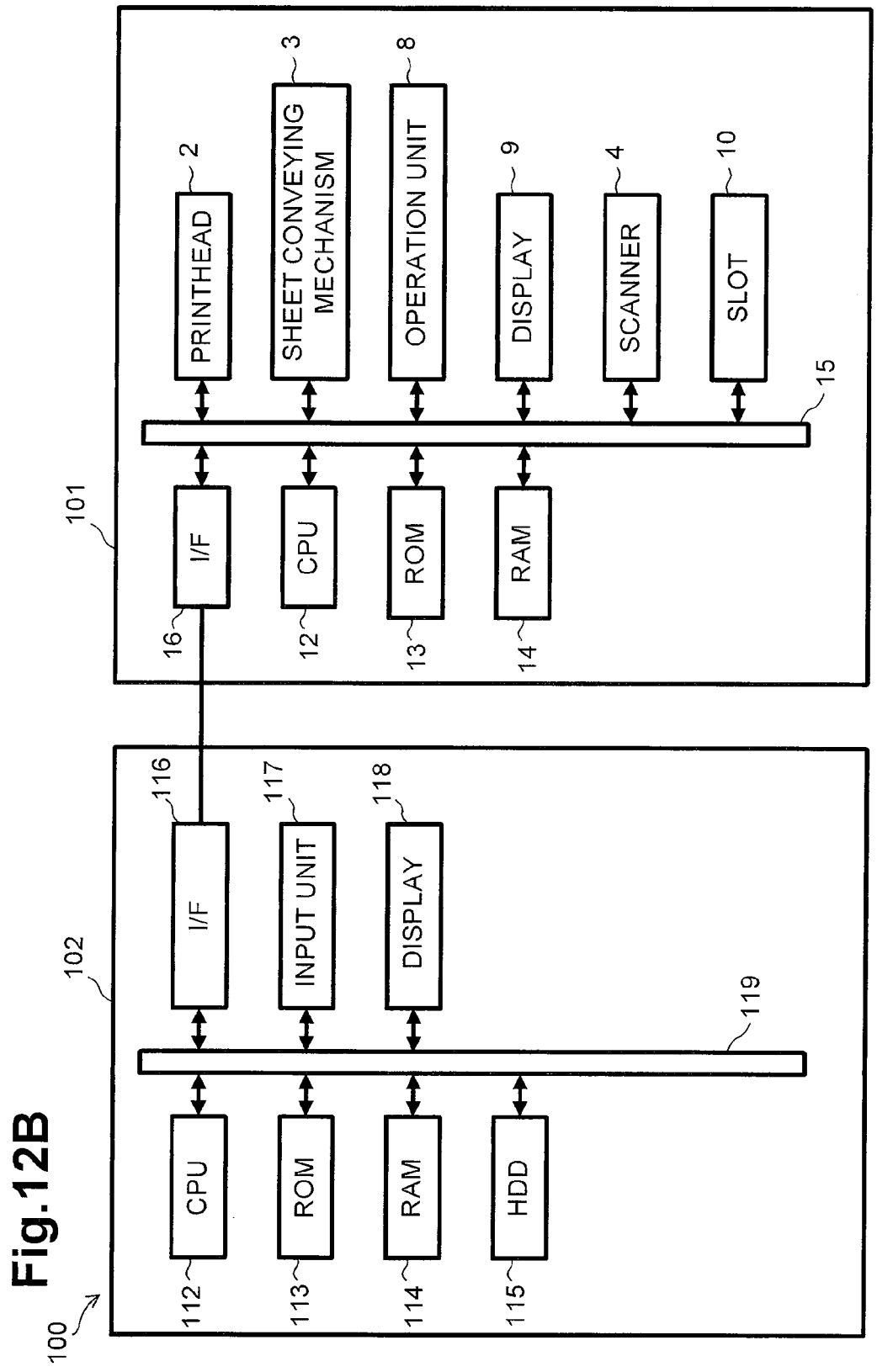
FIG. 12B is a block diagram showing an electrical structure of the printing system of FIG. 12A.
Figure 13:
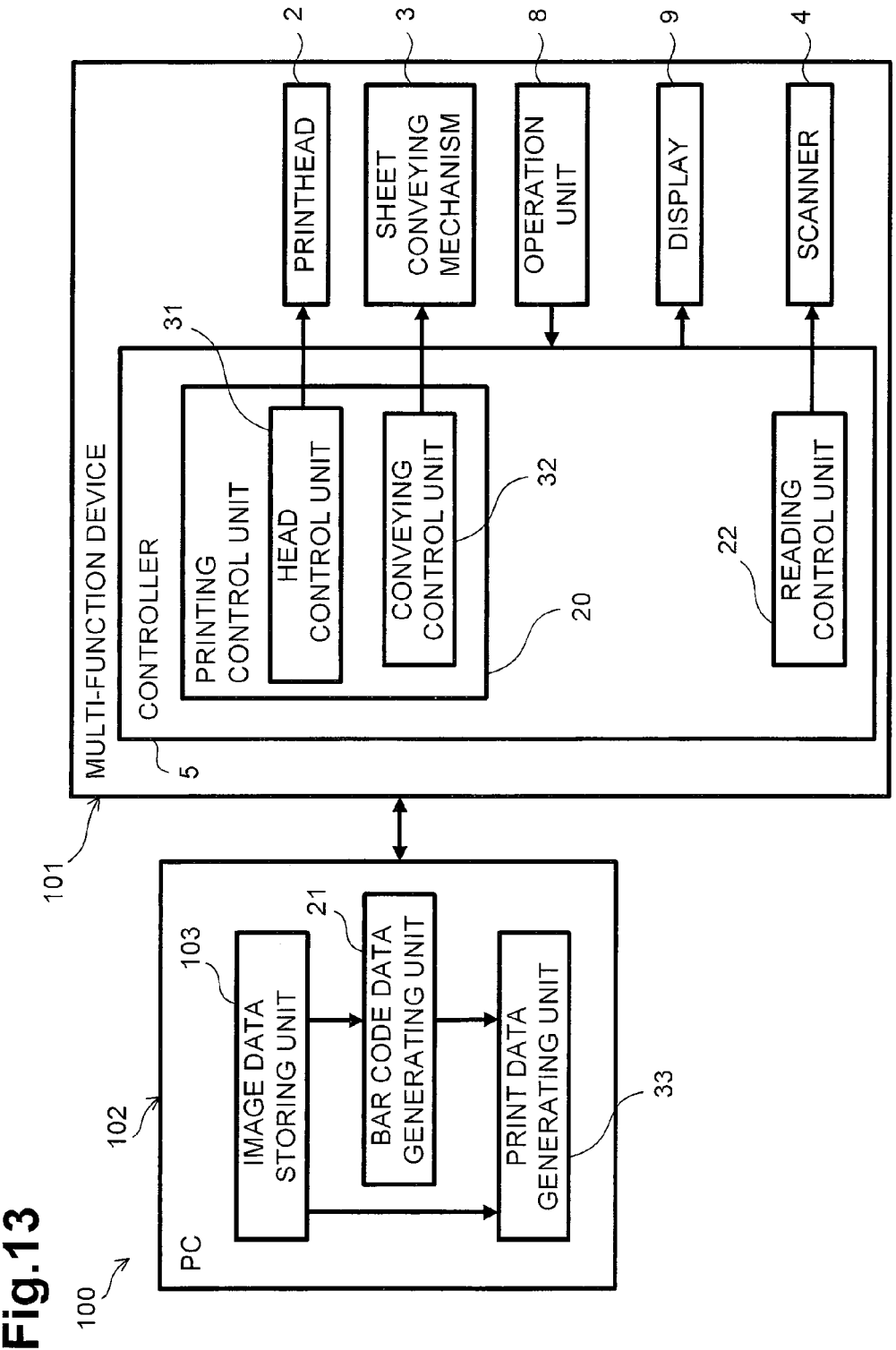
FIG. 13 is a diagram showing control executed by the PC and the controller of the multi-function device.

In yet another modification (eighth modification), the document is divided according to "chapter" (segment) and "section" (sub-segment), and the content of each section of the document (the first chapter is treated as a section) is stored in one of the bar codes B3, as in the seventh modification. As shown in FIGS. 11A to 11D, the document is printed on page 1 to page 7, as in the foregoing embodiment. As shown in FIG. 11D, the relationship among the chapters and sections (the structure of the document) is printed in tree form on page 8, and the bar codes B3 are printed in correspondence with the structure of the document. Thus, the bar codes B3 are arranged chapter by chapter, and the bar codes B3 are arranged laterally in order of section in each chapter. Furthermore, a corresponding section number D3 (identifying image) is printed below each bar code B3.

In this case, since the bar codes B3 are printed in correspondence with the structure of the document, the user can recognize the structure of the document and readily read a desired bar code B3 with the scanner 4.

In the above descriptions, although the bar codes store the data of the document page by page or section by section, data divided by any other break than page break and section break may be stored in the bar codes. Furthermore, the data of the document may be stored in the bar codes irrespective of the breaks of the document. For example, the data of the document may be stored in the bar codes such that the amounts of data stored therein are equal.

Although the above descriptions are made as applied to a case in a document is printed as an image, an image other than a document that spreads over a plurality of pages may be printed. An image including a photograph and a picture and continuing over pages may be printed, or an image including a photograph, a picture, and a document and continuing over pages may be printed. Also in this case, if bar codes storing the image continuing over pages are printed collectively on one page, the image printed over the pages can be retrieved by reading the bar codes printed on the one page with the scanner 4, without the need for turning the pages one by one.

Here, in the case where the printhead 2 is of an inkjet type in which dye ink and pigment ink are selectively ejected from nozzles and where an image that requires high image quality, such as a photograph, and a bar code are printed, it is preferable that the image be printed in dye ink, and a bar code be printed in pigment ink.

In this case, high image quality can be achieved for the image, such as a photograph, by printing it in dye ink. On the other hand, degradation of the bar code can be prevented by printing it in pigment ink. Even if the image printed in dye ink on the sheet P degrades, the printed image can be retrieved by reading the bar code.

In the above descriptions, although the image printed over a plurality of pages are stored in a plurality of bar codes, the present invention is not limited thereto. The image printed over the plurality of pages may be stored in a single bar code.

Furthermore, in the above descriptions, although the plurality of bar codes B1 to B3 are printed on only one page, the present invention is not limited thereto. For example, in the case where the number of bar codes is large, such as when the number of pages of image or the number of chapters or sections is large, and in the case where a table of contents or an index continues over a plurality of pages, the bar codes may be printed over a plurality of pages. In this case also, the bar codes printed in each page store a plurality of pages of the image or a plurality of segments of the image.

Furthermore, in the above descriptions, although the image (document) and the bar codes are printed on both sides of the sheet P, the image (document) and the bar codes may be printed on one side of the sheet P. In this case, no image is printed on the opposite side of the sheet P from the side on which the bar codes are printed, and the above-described bleed through of ink is not caused.

Although, in the above examples, all the processes are performed in the multi-function device 1, the present invention is not limited thereto. In another modification (a ninth modification), a multi-function device 101 and a personal computer (PC) 102 are connected to configure a print system 100, as shown in FIGS. 13A, 13B and 14. As shown in FIG. 13B, the PC 102 comprises a central processing unit (CPU) 112, a read only memory (ROM) 113, a random access memory (RAM) 114, a hard disc drive (HDD) 115, an interface (I/F) 116, an input device 117, and a display 118, and these elements are electrically connected via a bus 119. The PC 102 and the multi-function device 101 are electrically connected via interfaces (I/F) 16, 116. The HDD 115 is a mass storage device that stores various application programs to be executed by the CPU and various kinds of data including image data.

The CPU 112, ROM 113, RAM 114, and HDD 115 of the PC 102 function as the image data storing unit 103, bar code data generating unit 21, and print data generating unit 33. The CPU 12, ROM 13, and RAM 14 of the multi-function device 101 function as the head control unit 31, conveying control unit 32, and scanner control unit 41.

In the ninth modification, the PC 102 comprises a print data generating unit 33, a bar code data generating unit 21, and an image data storing unit 103 that is configured by the above-described mass storage device and stores image data of an original image to be printed. The bar code data generating unit 21 generate bar code data based on the image data stored in the image data storing unit 103. The print data generating unit 33 generates print data based on the image data stored in the image data storing unit 103 and the bar code data generated by the bar code data generating unit 21. On the other hand, the multi-function device 101 has a configuration in which the bar code data generating unit 21 and the print data generating unit 33 are excluded from the multi-function device 1 (see FIGS. 1 and 2).

Further, a non-transitory recording medium storing a computer-readable program may be installed in a computer so that the program is executed by a processer of the computer to cause the processor to carry out the steps S101-S103 to generate print data of a print image including an original image and bar codes.

The ninth modification offers substantially the same operational advantages as those of the foregoing embodiment, although part of the processes is performed by the PC 102 in the twelfth modification. As in the foregoing embodiment, when an original image continuing over a plurality of pages is printed, bar codes storing the original image are also printed on one page collectively. This allows the user to retrieve the original image printed over a plurality of pages by reading the bar codes, for example, with the scanner 4, without turning the pages one by one.

Although, in the ninth modification, the PC 102 comprises the bar code data generating unit 21 and the print data generating unit 33, the multi-function device 101 may comprise one or some of these units.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. A print data generating device comprising:
    a controller configured to:
        retrieve image data of an original image comprising a plurality of segments;
        generate, based on the image data of the original image, data of a plurality of bar codes, each of the plurality of bar codes storing a corresponding one of the plurality of segments of the original image, and an area occupied by each of the plurality of bar codes being smaller than an area occupied by the corresponding one of the plurality segments of the original image; and
        generate, based on the image data of the original image and the data of the plurality of bar codes, print data of a print image that includes the plurality of bar codes arranged collectively on one page and the original image arranged on one or more pages,
    wherein the one page on which the plurality of bar codes is arranged is different from the one or more pages on which the original image is arranged.

2. The print data generating device according to claim 1, further comprising a printing unit configured to print the print image on recording media, based on the print data.

3. The print data generating device according to claim 2, wherein the printing unit is configured to print the print image on both sides of the recording media, based on the print data.

4. The print data generating device according La claim 3, wherein the controller is further configured to generate the print data of the print image in which one of the plurality of segments of the original image is arranged on a front side of a recording medium, and the plurality of bar codes is arranged on a back side of the recording medium at a position not overlapping with the one of the plurality of segments of the original image.

5. The print data generating device according to claim 3, wherein the one page on which the plurality of bar codes is arranged is a last page in a sequence of pages, and wherein the controller is further configured to determine whether the last page is an odd page or an even page, and to add a blank page before the last page based on a result of determination.

6. The print data generating device according to claim 2, wherein the printing unit is configured to eject ink from nozzles.

7. The print data generating device according to claim 1, wherein the one page on which the plurality of bar codes is arranged is first in a sequence of pages.

8. The print data generating device according to claim 1, wherein the one page on which the plurality of bar codes is arranged is last in a sequence of pages.

9. The print data generating device according to claim 1, wherein the controller is configured to generate the print data of the print image that further includes an identifying image that is placed in the vicinity of a corresponding one of the bar codes and identifies a content of a corresponding segment of the original image stored in the corresponding one of the bar codes.

10. The print data generating device according to claim 1, wherein the corresponding segment of the original image stored in each of the plurality of bar codes corresponds to a respective single page of the original image.

11. The print data generating device according to claim 1,
    wherein each of the plurality of segments of the original image comprises a plurality of sub-segments,
    wherein the controller is configured to generate the data of the plurality of bar codes each storing a corresponding sub-segment of the original image, and
    wherein the controller is configured to generate, based on the data of the plurality of bar codes, the print data of the print image that includes the plurality of bar codes arranged segment by segment on the one page.

12. A non-transitory recording medium storing instructions that, if executed, causes an apparatus to:
    retrieve image data of an original image comprising a plurality of segments;
    generate, based on the image data of the original image, data of a plurality of bar codes, each of the plurality of bar codes storing a corresponding one of the plurality of segments of the original image, and an area occupied by each of the plurality of bar codes being smaller than an area occupied by the corresponding one of the plurality of segments of the original image: and
    generate, based on the image data of the original image and the data of the plurality of bar codes, print data of a print image that includes the plurality of bar codes arranged collectively on one page and the original image arranged on one or more pages,
    wherein the one page on which the plurality of bar codes is arranged is different from the one or more pages on which the original image is arranged.

13. The non-transitory recording medium according to claim 12, wherein the instructions, when executed, further cause the apparatus to generate the print data of the print image in which the plurality of bar codes is arranged on a first page of a sequence of pages.

14. The non-transitory recording medium according to claim 12, wherein the instructions, when executed, further cause the apparatus to generate the print data of the print image in which the plurality of bar codes is arranged on a last page of a sequence of pages.

15. The non-transitory recording medium according to claim 12,
    wherein each of the plurality of bar codes stores a corresponding page of the original image.

16. A print data generating device comprising:
a controller configured to:
- retrieve image data of an original image comprising a plurality of segments;
- generate, based on the image data of the original image, data of a plurality of bar codes, each of the plurality of bar codes storing a corresponding one of the plurality of segments of the original image, and an area occupied by each of the plurality of bar codes being smaller than an area occupied by the corresponding one of the plurality of segments of the original image; and
- generate, based on the image data of the original image and the data of the plurality of bar codes, print data of a print image that includes the plurality of bar codes arranged collectively on one page and the original image arranged on one or more pages, wherein the one page on which the plurality of bar codes is arranged is one of a first page and a last page in a sequence of pages, and one of the plurality of segments of the original image is placed on the one of the first page and the last page.

17. A non-transitory recording medium storing instructions that, when executed, cause an apparatus to:
- retrieve image data of an original image comprising a plurality of segments;
- generate, based on the image data of the original image, data of a plurality of bar codes, each of the plurality of bar codes storing a corresponding one of the plurality of segments of the original image, and an area occupied by each of the plurality of bar codes being smaller than an area occupied by the corresponding one of the plurality of segments of the original image; and
- generate, based on the image data of the original image and the data of the plurality of bar codes, print data of a print image that includes the plurality of bar codes arranged collectively on one page and the original image arranged on one or more pages, wherein the one page on which the plurality of bar codes is arranged is one of a first page and a last page in a sequence of pages, and one of the plurality of segments of the original image is placed on the one of the first page and the last page.

* * * * *

UNITED STATES PATENT AND TRADEMARK OFFICE
CERTIFICATE OF CORRECTION

| | | |
|---|---|---|
| PATENT NO. | : 8,576,444 B2 | Page 1 of 1 |
| APPLICATION NO. | : 13/032902 | |
| DATED | : November 5, 2013 | |
| INVENTOR(S) | : Hiroto Sugahara et al. | |

It is certified that error appears in the above-identified patent and that said Letters Patent is hereby corrected as shown below:

In the claims

In Column 9, Claim 1, Line 40:
    Please delete "plurality" and replace with --plurality of--

In Column 9, Claim 4, Line 56:
    Please delete "La" and replace with --to--

In Column 10, Claim 12, Line 45:
    Please delete "image" and replace with --image;--

Signed and Sealed this
Twenty-fourth Day of November, 2015

Michelle K. Lee
*Director of the United States Patent and Trademark Office*